United States Patent
Koyama et al.

(10) Patent No.: US 9,868,529 B2
(45) Date of Patent: Jan. 16, 2018

(54) AIRCRAFT LAVATORY UNIT

(75) Inventors: Takashi Koyama, Hiratsuka (JP); Masayuki Fushimi, Tokyo (JP)

(73) Assignee: The Yokohama Rubber Co., LTD. (JP)

( * ) Notice: Subject to any disclaimer, the term of this patent is extended or adjusted under 35 U.S.C. 154(b) by 168 days.

(21) Appl. No.: 14/424,866

(22) PCT Filed: Aug. 30, 2012

(86) PCT No.: PCT/JP2012/005498
§ 371 (c)(1),
(2), (4) Date: Jul. 28, 2015

(87) PCT Pub. No.: WO2014/033786
PCT Pub. Date: Mar. 6, 2014

(65) Prior Publication Data
US 2016/0059965 A1  Mar. 3, 2016

(51) Int. Cl.
*B64D 11/02* (2006.01)
*A47D 5/00* (2006.01)
*A47K 17/02* (2006.01)

(52) U.S. Cl.
CPC ............. *B64D 11/02* (2013.01); *A47D 5/003* (2013.01); *A47D 5/006* (2013.01); *A47K 17/026* (2013.01); *Y02T 50/46* (2013.01)

(58) Field of Classification Search
CPC ........ B64D 11/02; A47D 5/003; A47D 5/006; Y02T 50/46
USPC ..................................................... 244/118.5
See application file for complete search history.

(56) References Cited

U.S. PATENT DOCUMENTS

| 7,222,820 B2 * | 5/2007 | Wentland | B64D 11/02 244/118.5 |
| 7,364,119 B2 * | 4/2008 | Sprenger | B64D 11/00 244/118.6 |
| 8,944,377 B2 * | 2/2015 | McIntosh | E03D 11/00 244/118.2 |

(Continued)

FOREIGN PATENT DOCUMENTS

| JP | H01-146038 | 6/1989 |
| JP | H06-040399 | 2/1994 |
| JP | 2004-359165 | 12/2004 |

(Continued)

OTHER PUBLICATIONS

International Search Report for International Application No. PCT/JP2012/005498 dated Nov. 20, 2012, 4 pages, Japan.

*Primary Examiner* — Brian M O'Hara
*Assistant Examiner* — Keith L Dixon
(74) *Attorney, Agent, or Firm* — Thorpe North & Western (57) ABSTRACT

An aircraft lavatory unit that includes a diaper changing platform has a first side wall and a second side wall located on both sides of a toilet bowl, and a rear surface wall located to the rear of the toilet bowl. Handrails are provided on the first side wall and the second side wall. The diaper changing platform can be pivoted between a stowage position in which it is stowed in a stowage recess in the rear surface wall, and a usage position in which the diaper changing platform is lowered above the toilet bowl. The diaper changing platform is configured so that in the usage position it is supported by placing both sides of the bottom surface on the handrails of the first side wall and the second side wall.

4 Claims, 6 Drawing Sheets

(56) References Cited

U.S. PATENT DOCUMENTS

2012/0261509 A1* 10/2012 Grant .................... B64D 11/02
   244/118.5

FOREIGN PATENT DOCUMENTS

| JP | 2008-239039 | 10/2008 |
| JP | 2008-239042 | 10/2008 |

* cited by examiner

AIRCRAFT LAVATORY UNIT

TECHNICAL FIELD

The present technology relates to an aircraft lavatory unit.

BACKGROUND

A lavatory unit that includes a diaper changing platform for changing diapers on babies has been proposed as an aircraft lavatory unit (see Japanese Unexamined Patent Application Publication No. H06-40399A).

Aircraft lavatory units are disposed in limited space within aircraft, so the internal space within the lavatories is narrow.

Therefore, if the diaper changing platform is provided so that it can be pivoted between a stowage position against the wall face of the laboratory unit and a usage position in which the diaper changing platform is lowered about a support shaft as center, when a member that retains the diaper changing platform in the usage position is provided on the wall face of the laboratory chamber, the member projects into the laboratory unit when the diaper changing platform is not being used, and causes an obstruction.

Also, if the diaper changing platform is retained in the usage position by the support shaft portion of the diaper changing platform in order to eliminate this projection, when the diaper changing platform is in use, a large moment is applied to the support shaft portion, so the mechanism to retain the diaper changing platform in the usage position becomes elaborate, and the aircraft lavatory unit becomes larger, and the weight is increased.

SUMMARY

A handrail may be provided on the wall face of the lavatory unit contiguous with the toilet bowl for use when sitting onto the toilet bowl or standing up from the toilet bowl.

The present technology provides an aircraft lavatory unit that includes a diaper changing platform but that does not have a special member that projects within the laboratory chamber for supporting the diaper changing platform when not in use, and that is capable of stably supporting the diaper changing platform when in the usage position.

The aircraft lavatory unit according to the present technology is an aircraft lavatory unit having a toilet bowl provided within a structural frame, wherein the structural frame includes two first wall faces disposed opposite each other, and a second wall face that connects the first wall faces, the toilet bowl is disposed so that the two first wall faces are located at both sides of the toilet bowl, and the second wall face is located to the rear of the toilet bowl, handrails are provided at positions on the two first wall faces sandwiching the toilet bowl, the handrails for use when sitting down onto the toilet seat of the toilet bowl and when standing up from the toilet seat, a diaper changing platform is provided on the second wall face with a position above the toilet bowl as a support point, that is capable of being pivoted between a stowage position conforming to the second wall face and a usage position when it is lowered to above the toilet bowl, and in the usage position, the diaper changing platform is supported at side portions thereof on the two first wall face sides, by each of the handrails of the two first wall faces.

According to the present technology, both side portions of the diaper changing platform are supported by the handrails in the usage position, so it is not necessary that the hinge of the diaper changing platform be strong, which has the advantage that it is possible to reduce the size and weight of the lavatory unit.

Also, the diaper changing platform in the usage position is retained by the handrails that are used when sitting down onto the toilet seat or standing up from the toilet seat, so when the diaper support platform is not being used, special members for supporting the diaper changing platform do not project into the lavatory chamber, which has the advantage that the usability of the lavatory chamber is increased.

BRIEF DESCRIPTION OF THE DRAWINGS

FIGS. 4A and 4B are perspective views illustrating a configuration of an aircraft lavatory unit 12B according to a second embodiment. FIG. 4A illustrates the position when a door 3004 is closed, and FIG. 4B illustrates the position when the door 3004 is opened.

DETAILED DESCRIPTION

First Embodiment

The following is a description of an aircraft lavatory unit 12A (hereinafter, referred to as the lavatory unit 12A) according to a first embodiment with reference to FIGS. 1 to 3.

Figure 1:
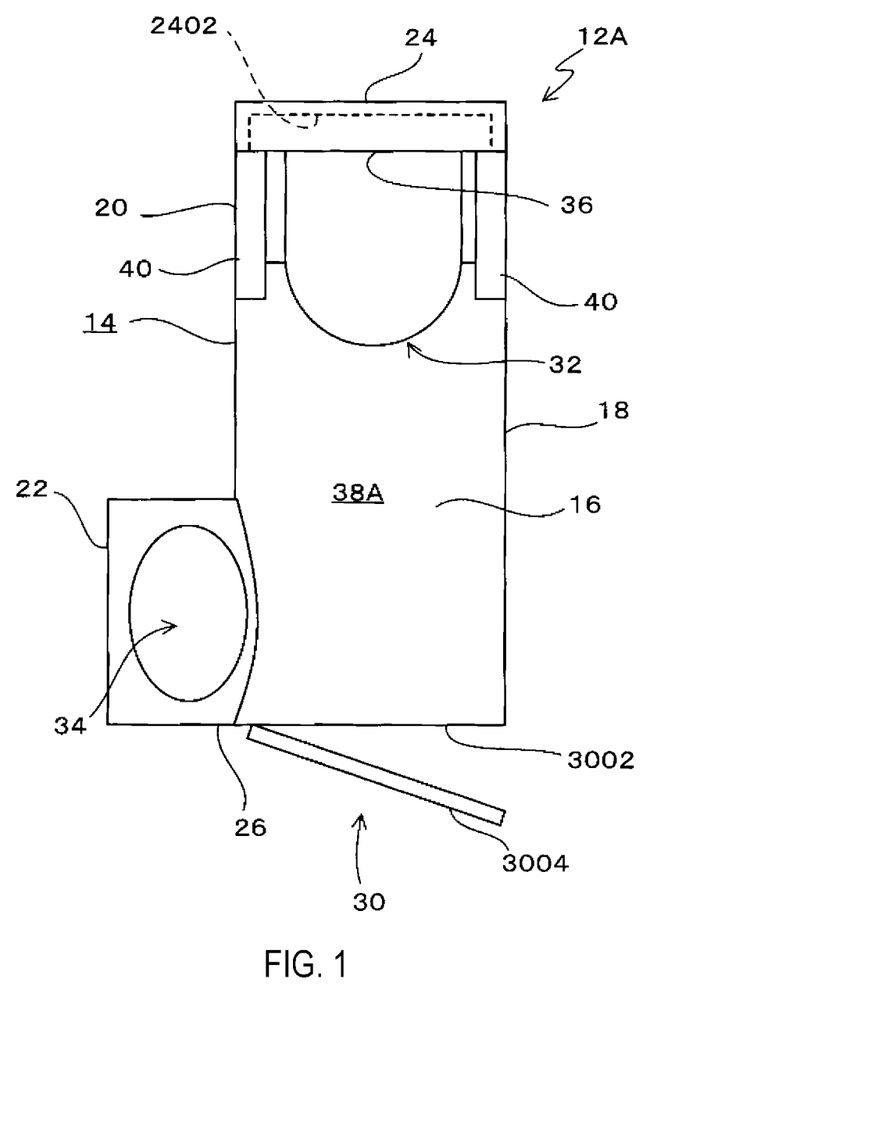
FIG. 1 is a plan view illustrating a configuration of an aircraft lavatory unit 12A according to a first embodiment.

As illustrated in FIG. 1, a structural frame 14 of the lavatory unit 12A includes a bottom wall 16, a first side wall 18, a second side wall 20, a third side wall 22, a rear surface wall 24, a front surface wall 26, and a ceiling wall which is not illustrated on the drawings.

The bottom wall 16 includes a rectangular narrow width part and a broad width part, and the bottom wall 16 constitutes the floor of the lavatory unit 12A.

The first side wall 18 rises from a first long side of the narrow width part and a first end portion of the broad width part, the second side wall 20 rises from a second long side of the narrow width part, and the third side wall 22 rises from a second end portion of the broad width part.

The rear surface wall 24 rises from a short side of the narrow width part and is connected to the end portions of the first side wall 18 and the second side wall 20. The rear surface wall 24 is formed into a shape that includes a curved surface corresponding to (overlapping with) the side wall of the fuselage, because the lavatory unit 12A is disposed near a side wall within the aircraft.

The front surface wall 26 rises from an end portion of the broad width part opposite the rear surface wall 24 and is connected to the first side wall 18 and the third side wall 22. A doorway 30 is provided in the front surface wall 26. The doorway 30 comprises an opening 3002 provided in the front surface wall 26, and a door 3004 that opens and closes off the opening 3002.

Also, a lavatory chamber 38A is formed by arranging a toilet bowl 32, a wash hand basin 34, and a diaper changing platform 36 within the structural frame 14.

The wash hand basin 34 is arranged in a location of the lavatory chamber 38A inside of the third side wall 22.

The toilet bowl 32 is arranged at the end of the lavatory chamber 38A on the rear surface wall 24 side, the first side wall 18 and the second side wall 20 are located on both sides of the toilet bowl 32, and the rear surface wall 24 is located to the rear of the toilet bowl 32. Therefore, in this embodiment, the wall face of the first side wall 18 and the second side wall 20 corresponds to the first wall face in the claims, and the wall face of the rear surface wall 24 corresponds to the second wall face in the claims.

The toilet bowl 32 comprises a toilet seat 3202, and a lid 3204 that covers the toilet seat 3202 in a lowered position and leaves the toilet seat 3202 open in a raised position.

Figure 2:
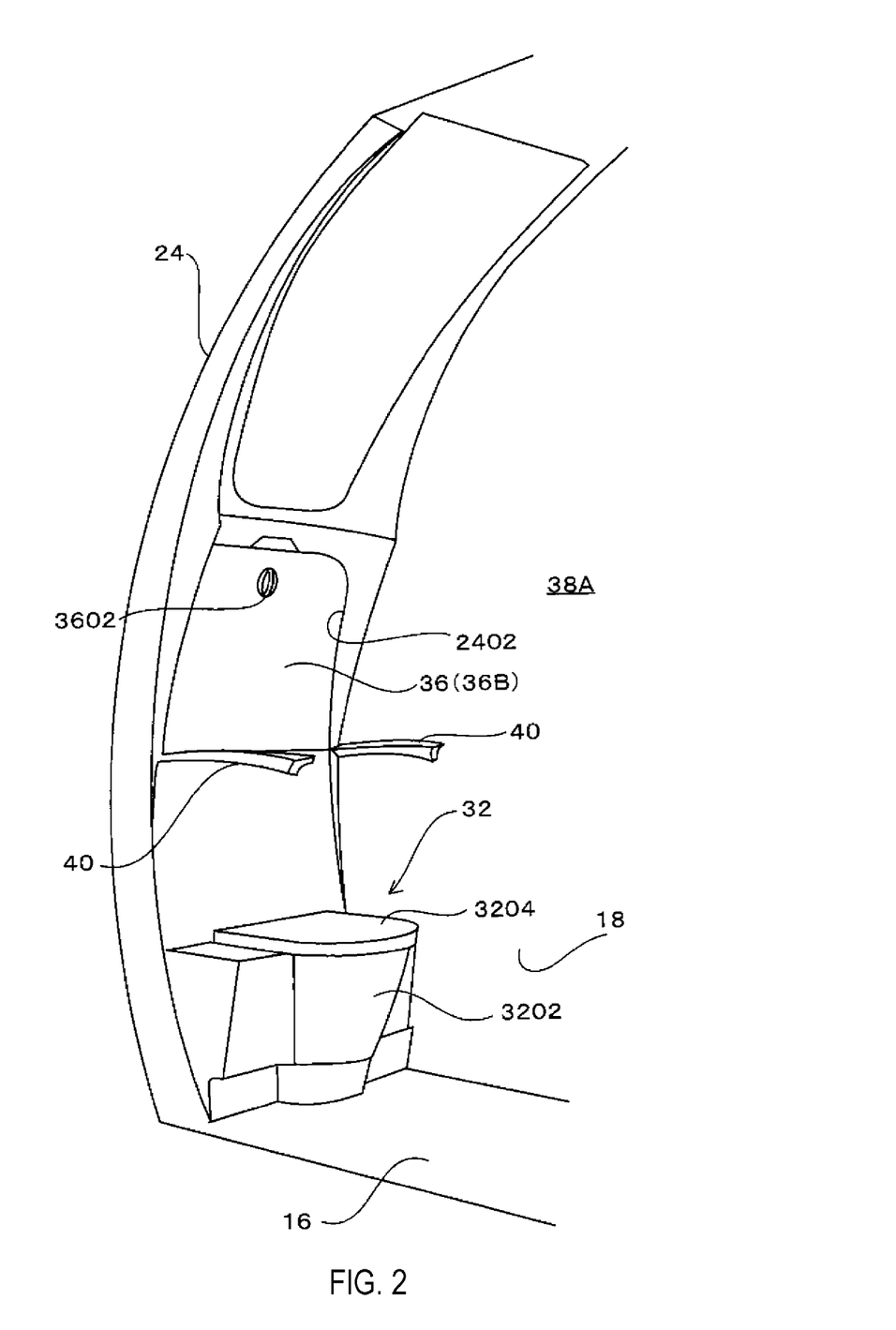
FIG. 2 is a perspective view illustrating the stowage position of a diaper changing platform 36 of the aircraft lavatory unit 12A according to the first embodiment.

As illustrated in FIGS. 1 and 2, handrails 40 are provided on the opposing first side wall 18 and the second side wall 20 which sandwich the toilet bowl 32, the handrails for use when sitting down on the toilet seat 3202 or when standing up from the toilet seat 3202.

The handrails 40 have an elongated shape extending substantially parallel to the floor.

The handrails 40 are formed integrally with the first side wall 18 and the second side wall 20.

Any of the conventionally known various shapes such as a rectangular or circular cross-section or the like can be used for the shape of the handrails 40 provided it is a shape that a hand can grip.

Figure 3:
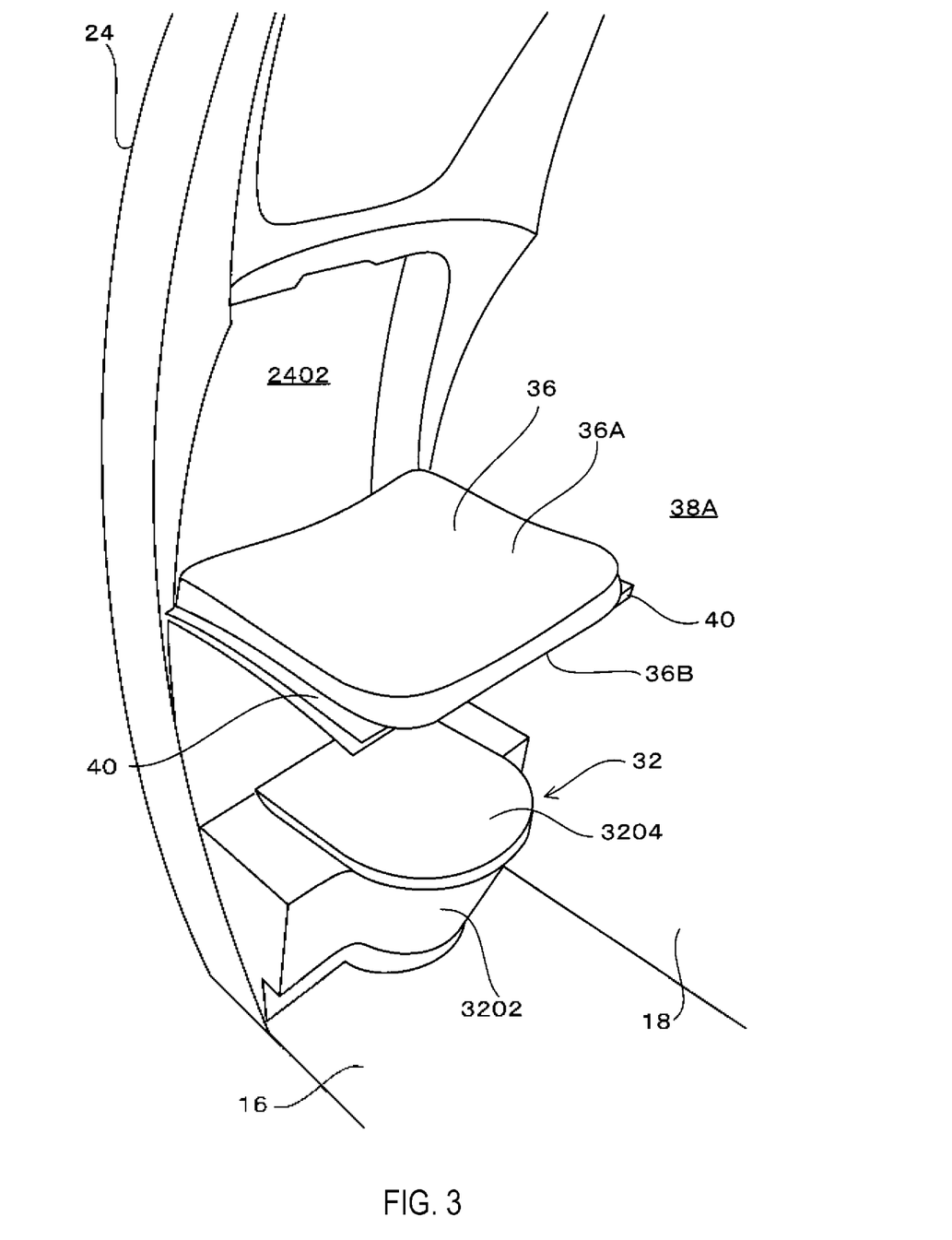
FIG. 3 is a perspective view illustrating the usage position of the diaper changing platform 36 of the aircraft lavatory unit 12A according to the first embodiment.

As illustrated in FIGS. 2 and 3, the diaper changing platform 36 has a substantially rectangular plate shape.

The diaper changing platform 36 is configured from, for example, a frame that is light and stiff made from a material such as a honeycomb sandwich panel, a synthetic resin, or the like, to which a cushioning material is applied. The position that the cushioning material is applied to is the top surface 36A on which a baby is laid down when changing its diaper. Note that the configuration of the diaper changing platform 36 can be any of the various commonly known structures.

The diaper changing platform 36 is attached at one side portion thereof to a position on the rear surface wall 24 located above the toilet bowl 32 via a hinge that is not illustrated on the drawings, and provided so that the diaper changing platform 36 can be pivoted between a stowage position in which the diaper changing platform 36 is stowed with the top surface 36A in a stowage recess 2402 in the rear surface wall 24 with the hinge as a support point, as illustrated in FIG. 2, and a usage position in which the diaper changing platform 36 is lowered above the toilet bowl 32 with the top surface 36A facing up, as illustrated in FIG. 3.

In this embodiment, in the stowage position of the diaper changing platform 36, the bottom surface 36B of the diaper changing platform 36 and the wall face of the rear surface wall 24 are configured as being continuous.

Also, a handle 3602 for disengaging actions and a fastener (not illustrated on the drawings) for disengaging from a catching part provided on the rear surface wall 24 using the action of the handle 3602 when the diaper changing platform 36 is in the stowage position are provided in a position on the bottom surface 36B of the diaper changing platform 36 on the opposite side to the hinge, as illustrated in FIG. 2. The diaper changing platform 36 is retained in the stowage position by engaging the fastener with the catching part with the action of the handle 3602, and when the engagement of the catching part with the fastener is released, the diaper changing platform 36 can be pivoted from the stowage position to the usage position.

The diaper changing platform 36 is configured so that in the usage position, the diaper changing platform 36 is supported by placing the side portion on the first side wall 18 side and the side portion on the second side wall 20 side of the bottom surface 36B on the handrails 40 of the first side wall 18 and the second side wall 20, and the diaper changing platform 36 is retained in the usage position.

In this embodiment, the diaper changing platform 36 is configured so that the entire length in the longitudinal direction of the top surface of the handrails 40 contacts the side portions of the bottom surface 36B of the diaper changing platform 36, and the diaper changing platform 36 can be retained more stably in the usage position.

According to this embodiment, both side portions of the bottom surface 36B of the diaper changing platform 36 are supported by the handrails 40 in the usage position, so it is not necessary that the structure of the hinge of the diaper changing platform 36 be strong, which has the advantage that it is possible to reduce the size and weight of the lavatory unit 12A.

Also, the diaper changing platform 36 in the usage position is retained by the handrails 40 that are used when sitting down onto the toilet seat 3202 or standing up from the toilet seat 3202, so when the diaper changing platform 36 is not being used, special members for supporting the diaper changing platform 36 do not project into the lavatory chamber 38A, which has the advantage that the usability of the narrow lavatory chamber 38A is increased.

Also, the entire length in the longitudinal direction of the handrails 40 contacts the side portions of the bottom surface 36B of the diaper changing platform 36, which has the advantage that the diaper changing platform 36 is stably supported in the usage position.

Second Embodiment

Next, an aircraft lavatory unit 12B (hereinafter, referred to as the lavatory unit 12B) according to a second embodiment is described with reference to FIGS. 4 to 6. In the description of the embodiment below, positions that are the same as or similar to those of the first embodiment are given the same reference numerals, and their description is omitted.

In the second embodiment, the structure of the structural frame 14 of the lavatory unit 12B differs from that of the first embodiment.

Figure 5:
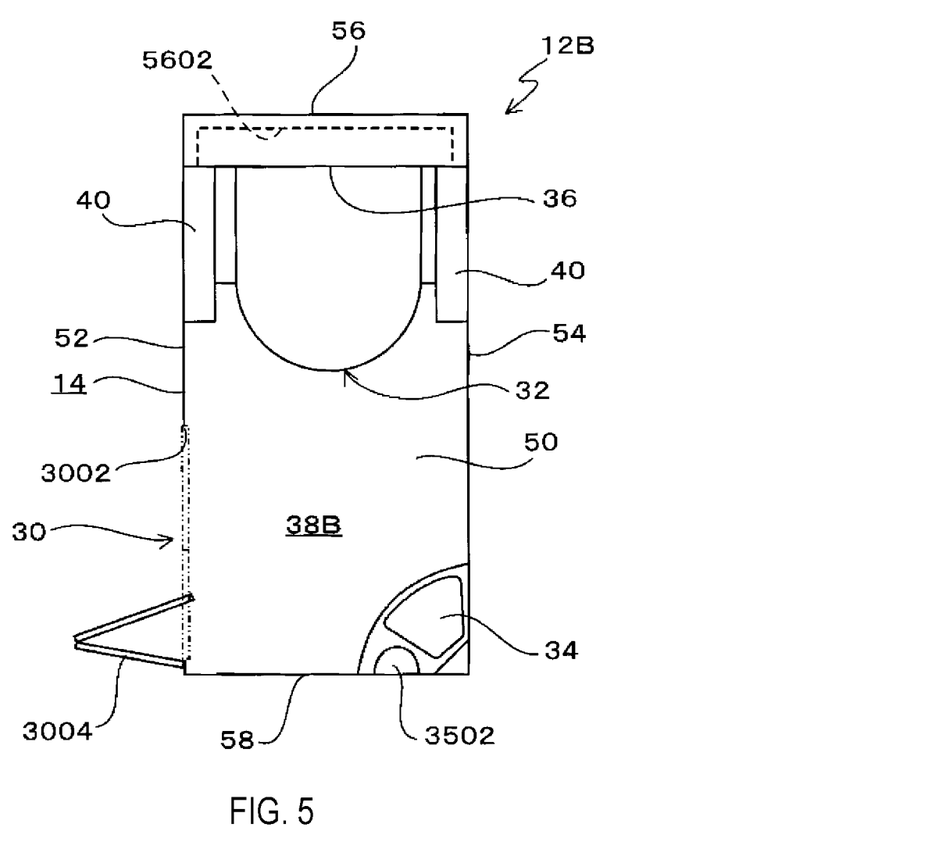
FIG. 5 is a plan view illustrating the configuration of the aircraft lavatory unit 12B according to the second embodiment.
Figure 6:
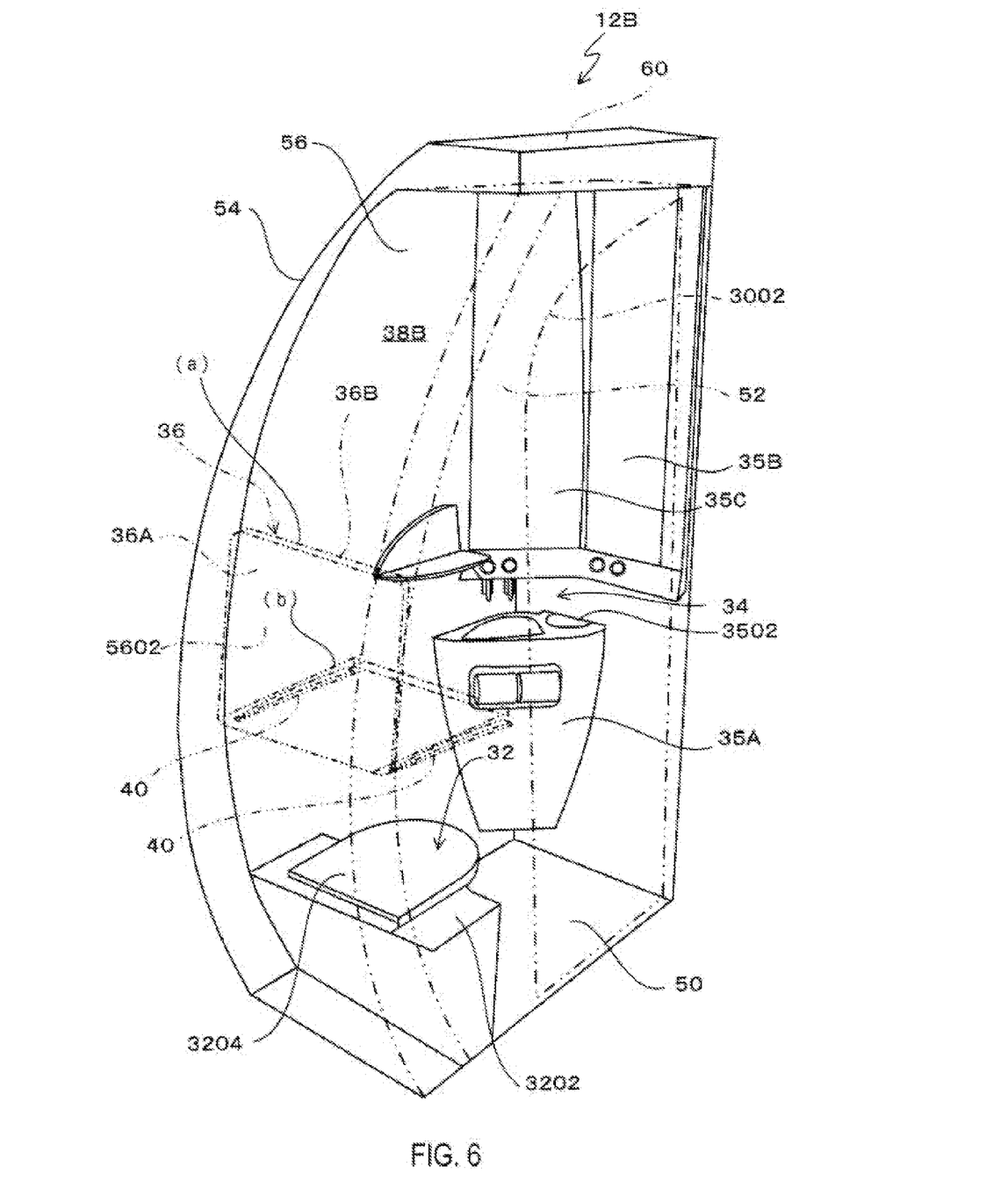
FIG. 6 is a perspective view illustrating the stowage position and usage position of the diaper changing platform 36 of the aircraft lavatory unit 12B according to the second embodiment.

In other words, a bottom wall 50 does not include the narrow width part and the broad width part of the first embodiment, but has a rectangular shape as illustrated in FIGS. 5 and 6.

The bottom wall 50 constitutes the floor of the lavatory unit 12B, a front surface wall 52 and a rear surface wall 54 rise from the long sides of the bottom wall 50, a first side wall 56 rises from a first short side of the bottom wall 50, a second side wall 58 rises from a second short side of the bottom wall 50, and a ceiling wall 60 is connected to the top portions of the front surface wall 52, the rear surface wall 54, the first side wall 56, and the second side wall 58.

The first side wall 56 is formed into a shape that includes a curved surface corresponding to (overlapping with) the side wall of the fuselage, because the lavatory unit 12B is disposed near a side wall within the aircraft.

Figure 4A:
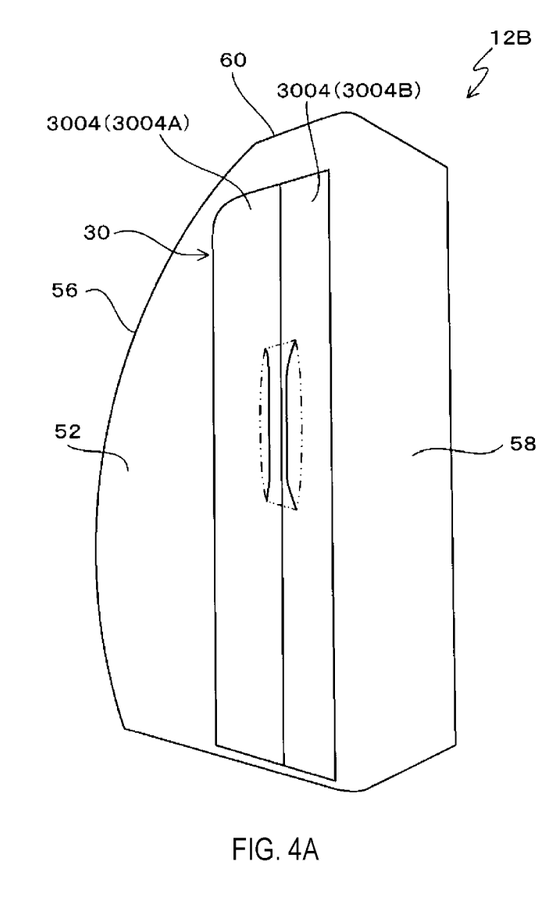
Figure 4B:
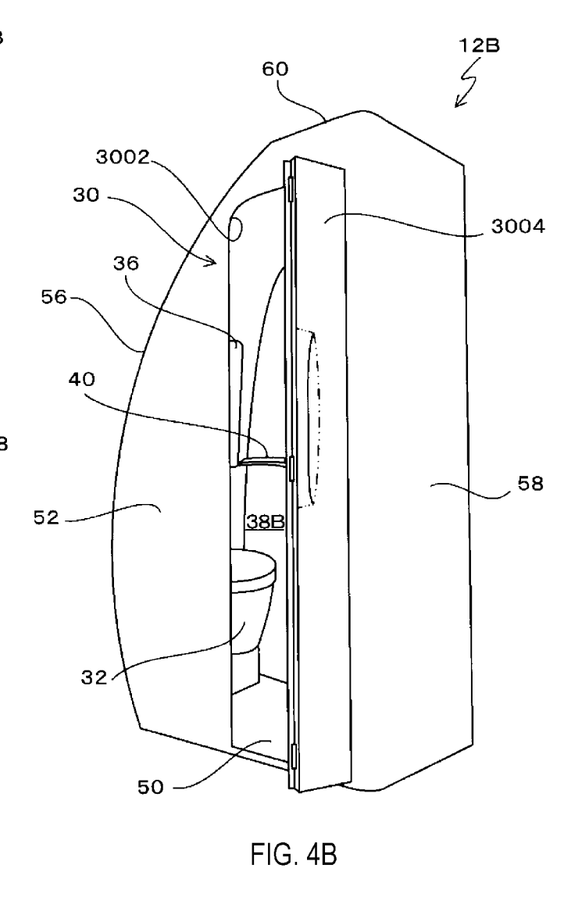

As illustrated in FIGS. 4A and 4B, the doorway 30 is provided in the front surface wall 52 at the end toward the second side wall 58. The doorway 30 comprises an opening 3002 provided in the front surface wall 52, and a door 3004 that opens and closes off the opening 3002. The door 3004 is a double-folded door including two door members 3004A, 3004B that open the opening 3002 by folding the outer surfaces of the two door members to the outside of the lavatory unit 12B in a V-shape.

Also, the toilet bowl 32, the wash hand basin 34, a dust box 35A, a mirror 35B, a stowage cabinet 35C, and the diaper changing platform 36 are disposed within the structural frame 14 to form a lavatory chamber 38B.

The wash hand basin 34 is disposed in the corner between the rear surface wall 54 and the second side wall 58 opposite the doorway 30, the dust box 35A is provided below the wash hand basin 34, the stowage cabinet 35C is provided above the wash hand basin 34, and reference numeral 3502 in FIGS. 5 and 6 indicates a trash feeding port of the dust box 35A.

The toilet bowl 32 is arranged at the end of the lavatory chamber 38B on the first side wall 56 side (the end of the bottom wall 50 toward the first side wall 56), the front surface wall 52 and the rear surface wall 54 are located on both sides of the toilet bowl 32, and the first side wall 56 is located to the rear of the toilet bowl 32. Therefore, in this embodiment, the wall face of the front surface wall 52 and the rear surface wall 54 corresponds to the first wall face in the claims, and the wall face of the first side wall 56 corresponds to the second wall face in the claims.

The toilet bowl 32 comprises a toilet seat 3202, and a lid 3204 that covers the toilet seat 3202 in a lowered position and leaves the toilet seat 3202 open in a raised position.

As illustrated in FIGS. 5 and 6, handrails 40 are provided on the opposing front surface wall 52 and the rear surface wall 54 which sandwich the toilet bowl 32, the handrails for use when sitting down on the toilet seat 3202 or when standing up from the toilet seat 3202, and the configuration of the handrails 40 is the same as that of the first embodiment.

As indicated by the imaginary lines in FIG. 6, the diaper changing platform 36 has a substantially rectangular plate-like shape, and the configuration of the diaper changing platform 36 is the same as that of the first embodiment.

The diaper changing platform 36 is attached at one side portion thereof to a position on the first side wall 56 located above the toilet bowl 32 via a hinge that is not illustrated on the drawings, the same as in the first embodiment, and provided so that the diaper changing platform 36 can be pivoted between a stowage position in which the diaper changing platform 36 is stowed with the top surface 36A in a stowage recess 5602 in the first side wall 56 with the hinge as a support point, as indicated by the symbol (a) in FIG. 6, and a usage position in which the diaper changing platform 36 is lowered above the toilet bowl 32 with the top surface 36A facing up, as indicated by the symbol (b) in FIG. 6.

In this embodiment, in the stowage position of the diaper changing platform 36, the bottom surface 36B of the diaper changing platform 36 and the wall face of the first side wall 56 are configured as being continuous.

Also, a handle 3602 (see FIG. 2) for disengaging actions and a fastener for disengaging from a catching part provided on the first side wall 56 using the action of the handle 3602 when the diaper changing platform 36 is in the stowage position are provided in a position on the bottom surface 36B of the diaper changing platform 36 on the opposite side to the hinge, as with the first embodiment. The diaper changing platform 36 is retained in the stowage position by engaging the fastener with the catching part with the action of the handle 3602, and when the engagement of the catching part with the fastener is released, the diaper changing platform 36 can be pivoted from the stowage position to the usage position.

The diaper changing platform 36 is configured so that in the usage position, the diaper changing platform 36 is supported by placing the side portion on the front surface wall 52 side and the side portion on the rear surface wall 54 side of the bottom surface 36B on the handrails 40 of the front surface wall 52 and the rear surface wall 54, and the diaper changing platform 36 is retained in the usage position.

In the second embodiment, the diaper changing platform 36 is configured so that the entire length in the longitudinal direction of the handrails 40 contacts the side portions of the bottom surface 36B of the diaper changing platform 36, and the diaper changing platform 36 can be retained more stably in the usage position, the same as in the first embodiment.

According to the second embodiment, the same effect as the first embodiment is exhibited.

In other words, both side portions of the bottom surface 36B of the diaper changing platform 36 are supported by the handrails 40 in the usage position, so it is not necessary that the structure of the hinge of the diaper changing platform 36 be strong, which has the advantage that it is possible to reduce the size and weight of the lavatory unit 12B.

Also, when the diaper changing platform 36 is not being used, special members for supporting the diaper changing platform 36 do not project into the lavatory chamber 38B, which has the advantage that the usability of the narrow lavatory chamber 38B is increased.

In particular, as in the second embodiment, because the lavatory unit 12B is arranged within limited space within an aircraft, the floor of the lavatory unit 12B has a rectangular shape, so it is extremely advantageous when the diaper changing platform 36 is provided in the narrow lavatory chamber 38B so that it can be pivoted without making the space within the lavatory chamber 38B narrower.

Also, the entire length in the longitudinal direction of the handrails 40 contacts the side portions of the bottom surface 36B of the diaper changing platform 36, which has the advantage that the diaper changing platform 36 is stably supported in the usage position.

What is claimed is:

1. An aircraft lavatory unit having a toilet bowl provided within a structural frame,
  the structural frame including two first wall faces disposed opposite each other, and a second wall face that connects the first wall faces, the second wall face being formed into a shape that includes a curved surface along a side wall of a fuselage of the aircraft,
  the toilet bowl being disposed so that the two first wall faces are located at sides of the toilet bowl, and the second wall face being located to a rear of the toilet bowl,
  handrails, each having an elongated shape, being provided at positions on the two first wall faces sandwiching the toilet bowl, the handrails for use when sitting down onto a toilet seat of the toilet bowl and when standing up from the toilet seat,
  a diaper changing platform being provided on the second wall face at a position above the toilet bowl with a hinge as a support point, that is capable of being pivoted between a stowage position conforming to the second wall face and a usage position when it is lowered to above the toilet bowl, a thickness of the second wall face being configured to become gradually thinner in a direction from a lower part to an upper part of the second wall face, the second wall face being provided with a stowage recess capable of stowing the diaper changing platform thereinto formed in the curved surface at a position higher than a position of the toilet bowl, the second wall face having a thickness formed by the stowage recess so that a bottom surface of the diaper changing platform and the second wall face are continuous when the diaper changing platform is stowed into the stowage recess, and the diaper changing platform being disposed at a position directly above the toilet bowl in the usage position and being supported by the handrails at side portions of the diaper changing platform on sides of the two first wall faces.

2. The aircraft lavatory unit according to claim 1, wherein the structural frame includes a floor, the handrails have an elongated shape and extend parallel to the floor, and the support of the side portions by the handrails in the usage position is through contact of an entire length in a longitudinal direction of the handrails with a bottom surface of the side portions of the diaper changing platform.

3. The aircraft lavatory unit according to claim 2, wherein the structural frame includes a rectangular shaped floor, a front surface wall that rises from a first long side of two long sides of the floor, a rear surface wall that rises from a second long side of the two long sides, a first side wall that rises from a first short side of two short sides of the floor, and a second side wall that rises from a second short side of the two short sides, the toilet bowl is disposed at an end portion of the floor near the first side wall, a doorway is provided in the front surface wall at an end portion near the second side wall, the two first wall faces are the wall faces of the front surface wall and the rear surface wall, and the second wall face is the wall face of the first side wall.

4. The aircraft lavatory unit according to claim 1, wherein the structural frame includes a rectangular shaped floor, a front surface wall that rises from a first long side of two long sides of the floor, a rear surface wall that rises from a second long side of the two long sides, a first side wall that rises from a first short side of two short sides of the floor, and a second side wall that rises from a second short side of the two short sides, the toilet bowl is disposed at an end portion of the floor near the first side wall, a doorway is provided in the front surface wall at an end portion near the second side wall, the two first wall faces are the wall faces of the front surface wall and the rear surface wall, and the second wall face is the wall face of the first side wall.

* * * * *